(12) United States Patent
Kohirkar et al.

(10) Patent No.: US 12,500,815 B2
(45) Date of Patent: Dec. 16, 2025

(54) NETWORK BANDWIDTH ARCHITECTURE FOR BIOINFORMATICS SYSTEM

(71) Applicant: GUARDANT HEALTH, INC., Palo Alto, CA (US)

(72) Inventors: Varsha Kohirkar, Palo Alto, CA (US); Mikhail Zhagrov, San Francisco, CA (US)

(73) Assignee: GUARDANT HEALTH, INC, Palo Alto, CA (US)

( * ) Notice: Subject to any disclaimer, the term of this patent is extended or adjusted under 35 U.S.C. 154(b) by 0 days.

(21) Appl. No.: 19/225,768

(22) Filed: Jun. 2, 2025

(65) Prior Publication Data

US 2025/0293934 A1  Sep. 18, 2025

Related U.S. Application Data

(63) Continuation of application No. PCT/US2024/015965, filed on Feb. 15, 2024.

(60) Provisional application No. 63/485,201, filed on Feb. 15, 2023.

(51) Int. Cl.
*H04L 41/0896* (2022.01)
*G16H 10/60* (2018.01)
*G16H 40/20* (2018.01)

(52) U.S. Cl.
CPC ......... *H04L 41/0896* (2013.01); *G16H 10/60* (2018.01); *G16H 40/20* (2018.01)

(58) Field of Classification Search
CPC ..... H04L 41/0896; H04L 47/76; G16H 10/60; G16H 40/20; G06F 9/4887; G06F 9/5027; G06F 3/0647; G06F 3/0604; G06F 3/0631; G06F 3/0676; G06F 3/0677; G06F 3/0682; G06F 3/0679; G06F 12/0877; G06F 11/3024; G06F 11/3419; G16B 40/00; G16B 30/00; G16B 50/00; G16B 20/20; G16B 20/40; G16B 10/00; H03K 19/17736; G06N 3/002; G06N 99/005
USPC ......................................... 709/226
See application file for complete search history.

(56) References Cited

U.S. PATENT DOCUMENTS

| | | | | |
|---|---|---|---|---|
| 8,768,731 | B2* | 7/2014 | Moore | G16H 20/40 |
| | | | | 705/4 |
| 9,600,625 | B2* | 3/2017 | Asadi | G16B 30/00 |
| 9,811,438 | B1* | 11/2017 | Barrett | G06F 11/3419 |
| 10,055,546 | B2* | 8/2018 | Soon-Shiong | H04L 67/12 |
| 11,424,020 | B2* | 8/2022 | Wisser | G06F 16/51 |
| 2004/0139222 | A1* | 7/2004 | Slik | G16H 10/60 |
| | | | | 709/236 |
| 2006/0095429 | A1* | 5/2006 | Abhyankar | G16H 30/20 |

(Continued)

FOREIGN PATENT DOCUMENTS

| CN | 106209454 A | 12/2016 |
|---|---|---|
| CN | 113965466 A | 1/2022 |

(Continued)

OTHER PUBLICATIONS

International Search Report for International Patent Application No. PCT/US2024/015965, dated May 16, 2024.

*Primary Examiner* — James N Fiorillo
(74) *Attorney, Agent, or Firm* — Brian T. Hahn

(57) ABSTRACT

A network bandwidth architecture controls data transfers between a life science service provider, a local network data repository, and a remote data repository. The data transfers may include patient data and patient metadata that are analyzed by a bioinformatics system of the life science service provider.

20 Claims, 5 Drawing Sheets

(56) References Cited

U.S. PATENT DOCUMENTS

| | | | | |
|---|---|---|---|---|
| 2006/0159098 A1* | 7/2006 | Munson | | H04L 47/32 |
| | | | | 370/394 |
| 2009/0099868 A1* | 4/2009 | Lustig | | G06Q 30/0601 |
| | | | | 705/26.1 |
| 2011/0010427 A1* | 1/2011 | Jnagal | | G06F 3/067 |
| | | | | 709/213 |
| 2012/0323603 A1* | 12/2012 | Muradia | | A61B 5/024 |
| | | | | 705/3 |
| 2013/0006867 A1* | 1/2013 | Dove | | H04L 9/083 |
| | | | | 707/827 |
| 2013/0326639 A1* | 12/2013 | Droste | | G06F 21/55 |
| | | | | 726/28 |
| 2014/0089511 A1* | 3/2014 | McLean | | G06F 9/5061 |
| | | | | 709/226 |
| 2014/0371109 A1* | 12/2014 | McMillen | | G06F 13/16 |
| | | | | 702/20 |
| 2016/0072723 A1* | 3/2016 | Shanmuganathan | | |
| | | | | H04L 69/163 |
| | | | | 709/226 |
| 2016/0210060 A1* | 7/2016 | Dreyer | | G06F 3/0659 |
| 2016/0315830 A1* | 10/2016 | Cote | | H04L 47/127 |
| 2017/0237445 A1* | 8/2017 | Cox | | G16B 50/50 |
| | | | | 341/51 |
| 2018/0121601 A1* | 5/2018 | Hahm | | G16B 50/30 |
| 2020/0279614 A1* | 9/2020 | Utro | | G16B 20/20 |
| 2020/0287920 A1* | 9/2020 | Mandrychenko | | H04L 67/5651 |
| 2020/0350038 A1* | 11/2020 | van Rooyen | | G16B 50/00 |
| 2021/0019284 A1* | 1/2021 | Bowman | | G06F 16/278 |
| 2022/0066832 A1* | 3/2022 | Donaghy | | G06F 3/0676 |
| 2022/0197955 A1* | 6/2022 | Nie | | G06F 16/90344 |
| 2022/0405402 A1* | 12/2022 | Spangenberg | | H04L 9/50 |
| 2025/0110954 A1* | 4/2025 | Pal | | G06F 16/258 |
| 2025/0182866 A1* | 6/2025 | Choi | | G06F 21/33 |
| 2025/0259724 A1* | 8/2025 | Crabtree | | G16H 50/50 |

FOREIGN PATENT DOCUMENTS

| | | |
|---|---|---|
| KR | 20140135487 A | 11/2014 |
| WO | 2024173666 A1 | 8/2024 |

\* cited by examiner

NETWORK BANDWIDTH ARCHITECTURE FOR BIOINFORMATICS SYSTEM

PRIORITY CLAIM

This application is a continuation application of PCT Application No. PCT/US2024/015965, filed Feb. 15, 2024, which claims the benefit of priority to U.S. Provisional Patent Application No. 63/485,201, filed on Feb. 15, 2023, and entitled "Network Bandwidth Architecture For Bioinformatics System," which is incorporated by reference herein in its entirety.

TECHNICAL FIELD

Implementations of the present disclosure relate generally to the field of high-performance computer architectures, and more particularly to implementations of high-performance computer architectures for controlling network bandwidth in relation to data transfers in various systems, such as media streaming systems, scientific research systems, bioinformatics systems, content production systems, and the like.

BACKGROUND

The transfer of large amounts of data and performing computations using large amounts of data can be performed by high performance computing systems. For example, bioinformatics can involve the analysis of large amounts of data in an effort to analyze causes of various biological conditions and to identify treatments for a number of biological conditions. In many cases, bioinformatics can relate to the computational analysis of genomics data. Genomics data can include nucleotide sequences of genetic material obtained from samples of individuals. Genomics data from a single individual can correspond to many megabytes of data storage space while genomics data of various cohorts of individuals can correspond to hundreds of gigabytes up to many terabytes of data storage space. In other examples, high performance computing systems can be used in forecasting and modeling scenarios in relation to meteorological data and geological data as well as in the execution of machine learning algorithms and in fraud detection. Due to the large amounts of data accessed and analyzed by bioinformatics systems and other systems that utilize high performance computing, the storage and transfer of this data can be inefficient in terms of network resources utilized as well as result in performance lag.

SUMMARY

Figure 1:
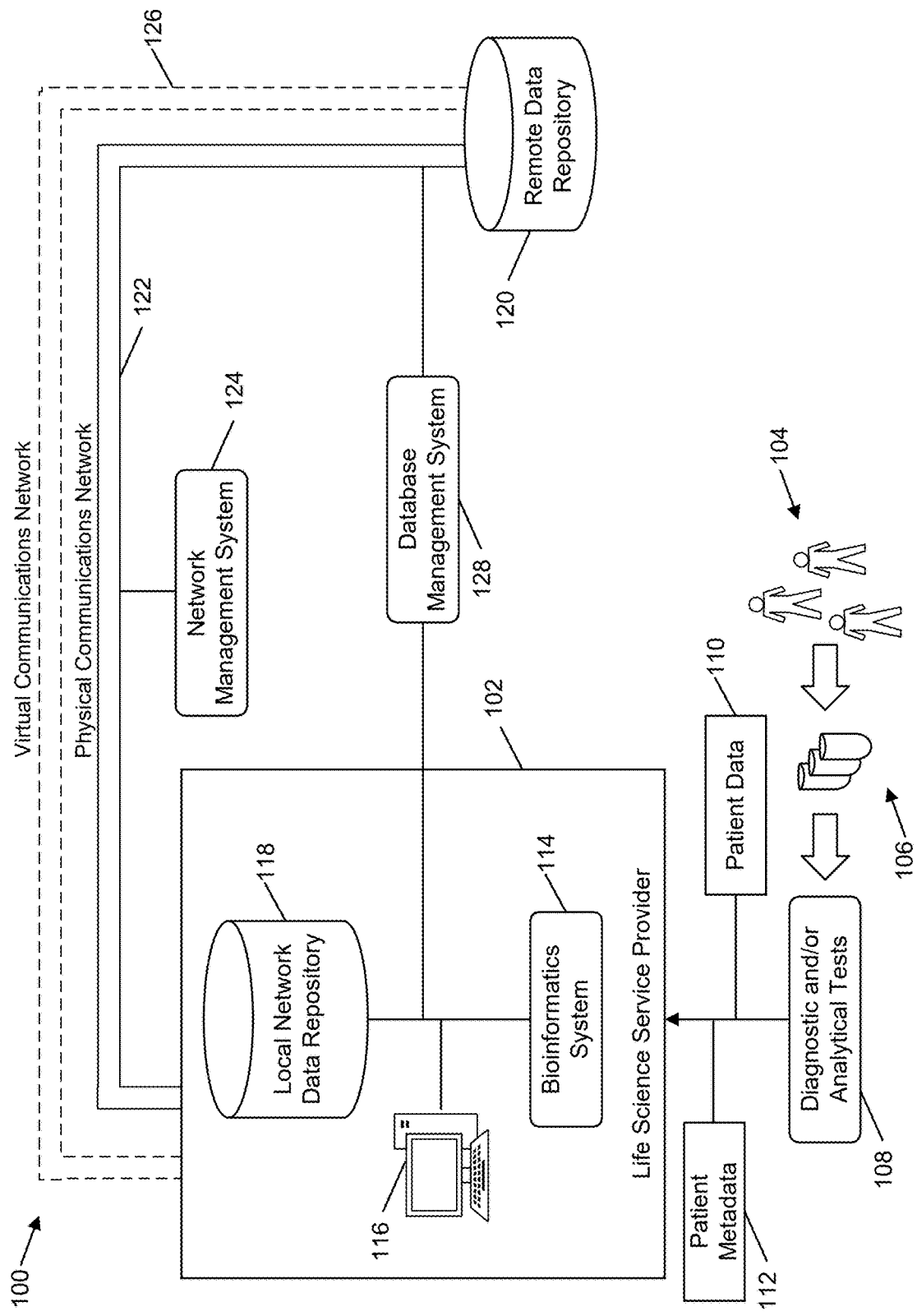
FIG. 1 illustrates an example architecture to transfer patient data and patient metadata between one or more data repositories and computational systems that analyze the patient data and patient metadata, according to one or more implementations.

In one or more aspects, the techniques described herein relate to a method including: obtaining, by a computing system of a life science service provider that includes processing circuitry and memory, a first amount of data that includes patient data and a second amount of data that includes patient metadata, the patient data including genomic information of a number of subjects; causing, by the computing system, the first amount of data to be stored by a local network data repository that is at least one of controlled, maintained, or managed by the life science service provider; generating, by the computing system, a first bandwidth modification request to modify an allocation of network resources of a physical communications network to the life science service provider from a first amount of network resources to a second amount of network resources, the second amount of network resources being greater than the first amount of network resources; causing, by the computing system, at least a portion of the second amount of data to be transferred to a remote data repository while the second amount of network resources is allocated to the life science service provider; determining, by the computing system, that transfer of the at least a portion of the second amount of data to the remote data repository is complete; and generating, by the computing system, a second bandwidth modification request to modify the allocation of network resources of the physical communications network to the life science service provider from the second amount to the first amount.

In one or more aspects, the techniques described herein relate to a method, including: receiving, by the computing system, a request to retrieve a portion of the patient data; determining, by the computing system, one or more portions of the patient metadata that corresponds to the portion of the patient data; sending, by the computing system, a request to a database management system to access the portion of the patient data stored by the local network data repository and the one or more portions of the patient metadata stored by the remote data repository; and obtaining, by the computing system, the portion of the patient data and the one or more portions of the patient metadata.

In one or more aspects, the techniques described herein relate to a method, including: performing, by a bioinformatics system implemented by the computing system, an analysis of the portion of the patient data and the one or more portions of the patient metadata; and determining, by the computing system and based on the analysis, one or more characteristics of subjects that correspond to the portion of the patient data and the one or more portions of the patient metadata.

In one or more aspects, the techniques described herein relate to a method, wherein: the one or more characteristics include one or more genomic mutations present in nucleic acids derived from samples obtained from the subjects; and the nucleic acids correspond to cell-free deoxyribonucleic acid (DNA) extracted from bodily fluid samples obtained from the subjects.

In one or more aspects, the techniques described herein relate to a method, wherein the one or more characteristics include developing resistance to a treatment provided to the subjects in conjunction with a biological condition present in the subjects.

In one or more aspects, the techniques described herein relate to a method, wherein the biological condition corresponds to a form of cancer.

In one or more aspects, the techniques described herein relate to a method, wherein the analysis includes determining a recommendation for a treatment to provide to the subjects to treat a biological condition present in the subjects.

In one or more aspects, the techniques described herein relate to a method, wherein a portion of the patient data is transferred to the local network data repository in addition to transferring at least a portion of the patient metadata to the remote data repository.

In one or more aspects, the techniques described herein relate to a method, including: determining, by the computing system, an amount of memory storage space to store at least a portion of the patient metadata; and determining, by the computing system, that the amount of memory storage space is at least a threshold amount of memory storage space; wherein the first bandwidth modification request is generated based on the amount of memory storage space being at least the threshold amount of memory storage space.

In one or more aspects, the techniques described herein relate to a method, wherein the second amount of network resources corresponds to a minimum transfer rate of at least a portion of the patient metadata via the physical communications network from the life science service provider to the remote data repository.

In one or more aspects, the techniques described herein relate to a method, wherein the second amount of network resources corresponds to transferring at least a portion of the patient metadata from the life science service provider to the remote data repository in less than a threshold amount of time.

In one or more aspects, the techniques described herein relate to a method, wherein the first bandwidth modification request and the second bandwidth modification request include one or more calls of an application programming interface (API) of a cloud storage service provider.

In one or more aspects, the techniques described herein relate to a system including: one or more hardware processing units; and one or more computer-readable storage media storing computer-executable instructions that, when executed by the one or more hardware processing units, cause the system to perform operations including: obtaining, by a life science service provider, a first amount of data that includes patient data and a second amount of data that includes patient metadata, the patient data including genomic information of a number of subjects; causing the first amount of data to be stored by a local network data repository that is at least one of controlled, maintained, or managed by the life science service provider; generating a first bandwidth modification request to modify an allocation of network resources of a physical communications network to the life science service provider from a first amount of network resources to a second amount of network resources, the second amount of network resources being greater than the first amount of network resources; causing at least a portion of the second amount of data to be transferred to a remote data repository while the second amount of network resources is allocated to the life science service provider; determining that transfer of the at least a portion of the second amount of data to the remote data repository is complete; and generating a second bandwidth modification request to modify the allocation of network resources of the physical communications network to the life science service provider from the second amount to the first amount.

In one or more aspects, the techniques described herein relate to a system, wherein the one or more computer-readable storage media store additional computer-executable instructions that, when executed by the one or more hardware processing units, cause the system to perform additional operations including: receiving a request to retrieve a portion of the patient data; determining one or more portions of the patient metadata that corresponds to the portion of the patient data; sending a request to a database management system to access the portion of the patient data stored by the local network data repository and the one or more portions of the patient metadata stored by the remote data repository; and obtaining the portion of the patient data and the one or more portions of the patient metadata.

In one or more aspects, the techniques described herein relate to a system, wherein the one or more computer-readable storage media store additional computer-executable instructions that, when executed by the one or more hardware processing units, cause the system to perform additional operations including: performing, by a bioinformatics system of the life science service provider, an analysis of the portion of the patient data and the one or more portions of the patient metadata; and determining, based on the analysis, one or more characteristics of subjects that correspond to the portion of the patient data and the one or more portions of the patient metadata.

In one or more aspects, the techniques described herein relate to a system, wherein: the one or more characteristics include one or more genomic mutations present in nucleic acids derived from samples obtained from the subjects; and the nucleic acids correspond to cell-free deoxyribonucleic acid (DNA) extracted from bodily fluid samples obtained from the subjects.

In one or more aspects, the techniques described herein relate to a system, wherein the one or more characteristics include developing resistance to a treatment provided to the subjects in conjunction with a biological condition present in the subjects.

In one or more aspects, the techniques described herein relate to a system, wherein the biological condition corresponds to a form of cancer.

In one or more aspects, the techniques described herein relate to a system, wherein the one or more computer-readable storage media store additional computer-executable instructions that, when executed by the one or more hardware processing units, cause the system to perform additional operations including: determining, as part of the analysis, a recommendation for a treatment to provide to the subjects to treat a biological condition present in the subjects.

In one or more aspects, the techniques described herein relate to a system, wherein the one or more computer-readable storage media store additional computer-executable instructions that, when executed by the one or more hardware processing units, cause the system to perform additional operations including: transferring a portion of the patient data to the local network data repository in conjunction with the transfer of at least a portion of the patient metadata to the remote data repository.

In one or more aspects, the techniques described herein relate to a system, wherein: the one or more computer-readable storage media store additional computer-executable instructions that, when executed by the one or more hardware processing units, cause the system to perform additional operations including: determining an amount of memory storage space to store at least a portion of the patient metadata; and determining that the amount of memory storage space is at least a threshold amount of memory storage space; and wherein the first bandwidth modification request is generated based on the amount of memory storage space being at least the threshold amount of memory storage space.

In one or more aspects, the techniques described herein relate to a system, wherein the second amount of network resources corresponds to a minimum transfer rate of at least a portion of the patient metadata via the physical communications network from the life science service provider to the remote data repository.

In one or more aspects, the techniques described herein relate to a system, wherein the second amount of network resources corresponds to transferring at least a portion of the patient metadata from the life science service provider to the remote data repository in less than a threshold amount of time.

In one or more aspects, the techniques described herein relate to a system, wherein the first bandwidth modification request and the second bandwidth modification request include one or more calls of an application programming interface (API) of a cloud storage service provider.

In one or more aspects, the techniques described herein relate to one or more non-transitory computer-readable storage media storing computer-executable instructions that, when executed by one or more hardware processing units, cause a system to perform operations including: obtaining, by a life science service provider, a first amount of data that includes patient data and a second amount of data that includes patient metadata, the patient data including genomic information of a number of subjects; causing the first amount of data to be stored by a local network data repository that is at least one of controlled, maintained, or managed by the life science service provider; generating a first bandwidth modification request to modify an allocation of network resources of a physical communications network to the life science service provider from a first amount of network resources to a second amount of network resources, the second amount of network resources being greater than the first amount of network resources; causing at least a portion of the second amount of data to be transferred to a remote data repository while the second amount of network resources is allocated to the life science service provider; determining that transfer of the at least a portion of the second amount of data to the remote data repository is complete; and generating a second bandwidth modification request to modify the allocation of network resources of the physical communications network to the life science service provider from the second amount to the first amount.

In one or more aspects, the techniques described herein relate to one or more non-transitory computer-readable storage media, including additional computer-executable instructions that, when executed by the one or more hardware processing units, cause the system to perform additional operations including: receiving a request to retrieve a portion of the patient data; determining one or more portions of the patient metadata that corresponds to the portion of the patient data; sending a request to a database management system to access the portion of the patient data stored by the local network data repository and the one or more portions of the patient metadata stored by the remote data repository; and obtaining the portion of the patient data and the one or more portions of the patient metadata.

In one or more aspects, the techniques described herein relate to one or more non-transitory computer-readable storage media, including additional computer-executable instructions that, when executed by the one or more hardware processing units, cause the system to perform additional operations including: performing, by a bioinformatics system of the life science service provider, an analysis of the portion of the patient data and the one or more portions of the patient metadata; and determining, based on the analysis, one or more characteristics of subjects that correspond to the portion of the patient data and the one or more portions of the patient metadata.

In one or more aspects, the techniques described herein relate to one or more non-transitory computer-readable storage media, wherein: the one or more characteristics include one or more genomic mutations present in nucleic acids derived from samples obtained from the subjects; and the nucleic acids correspond to cell-free deoxyribonucleic acid (DNA) extracted from bodily fluid samples obtained from the subjects.

In one or more aspects, the techniques described herein relate to one or more non-transitory computer-readable storage media, wherein the one or more characteristics include developing resistance to a treatment provided to the subjects in conjunction with a biological condition present in the subjects.

In one or more aspects, the techniques described herein relate to one or more non-transitory computer-readable storage media, wherein the biological condition corresponds to a form of cancer.

In one or more aspects, the techniques described herein relate to one or more non-transitory computer-readable storage media, including additional computer-executable instructions that, when executed by the one or more hardware processing units, cause the system to perform additional operations including: determining, as part of the analysis, a recommendation for a treatment to provide to the subjects to treat a biological condition present in the subjects.

In one or more aspects, the techniques described herein relate to one or more non-transitory computer-readable storage media, including additional computer-executable instructions that, when executed by the one or more hardware processing units, cause the system to perform additional operations including: transferring a portion of the patient data to the local network data repository in conjunction with transferring at least a portion of the patient metadata to the remote data repository.

In one or more aspects, the techniques described herein relate to one or more non-transitory computer-readable storage media, including additional computer-executable instructions that, when executed by the one or more hardware processing units, cause the system to perform additional operations including: determining an amount of memory storage space to store at least a portion of the patient metadata; and determining that the amount of memory storage space is at least a threshold amount of memory storage space; wherein the first bandwidth modification request is generated based on the amount of memory storage space being at least the threshold amount of memory storage space.

In one or more aspects, the techniques described herein relate to one or more non-transitory computer-readable storage media, wherein the second amount of network resources corresponds to a minimum transfer rate of at least a portion of the patient metadata via the physical communications network from the life science service provider to the remote data repository.

In one or more aspects, the techniques described herein relate to one or more non-transitory computer-readable storage media, wherein the second amount of network resources corresponds to transferring at least a portion of the patient metadata from the life science service provider to the remote data repository in less than a threshold amount of time.

In one or more aspects, the techniques described herein relate to one or more non-transitory computer-readable storage media, wherein the first bandwidth modification request and the second bandwidth modification request include one or more calls of an application programming interface (API) of a cloud storage service provider.

In one or more aspects, the techniques described herein relate to a method including: obtaining, by a high performance computing system that includes processing circuitry and memory, a first amount of system data and a second amount of data that includes metadata; causing, by the high performance computing system, the first amount of system data to be stored by a local network data repository; generating, by the high performance computing system, a first bandwidth modification request to modify an allocation of network resources of a physical communications network from a first amount of network resources to a second amount of network resources, the second amount of network resources being greater than the first amount of network resources; causing, by the high performance computing system, at least a portion of the second amount of data to be transferred to a remote data repository while the second amount of network resources is allocated; determining, by the high performance computing system, that transfer of the at least a portion of the second amount of data to the remote data repository is complete; and generating, by the high performance computing system, a second bandwidth modification request to modify the allocation of network resources of the physical communications network from the second amount to the first amount.

In one or more aspects, the techniques described herein relate to a method, including: receiving, by the high performance computing system, a request to retrieve a portion of the system data; determining, by the computing system, one or more portions of the metadata that corresponds to the portion of the system data; sending, by the high performance computing system, a request to a database management system to access the portion of the system data stored by the local network data repository and the one or more portions of the metadata stored by the remote data repository; and obtaining, by the high performance computing system, the portion of the system data and the one or more portions of the metadata.

In one or more aspects, the techniques described herein relate to a method, including: performing, by the high performance computing system, an analysis of the portion of the system data and the one or more portions of the metadata; and determining, by the high performance computing system and based on the analysis, one or more characteristics of information that corresponds to the portion of the system data and the one or more portions of the metadata.

In one or more aspects, the techniques described herein relate to a method, wherein the system data includes media content and the high performance computing system and the local network data repository are at least one of controlled, maintained, or managed by at least one of a media content provider, a communications company, or a content streaming service.

In one or more aspects, the techniques described herein relate to a method, wherein the system data includes scientific data and the high performance computing system and the local network data repository are at least one of controlled, maintained, or managed by at least one of a research institution or an academic institution.

In one or more aspects, the techniques described herein relate to a method, wherein the system data includes patient data and the metadata includes patient metadata with the patient data including genomic information of a number of subjects.

In one or more aspects, the techniques described herein relate to a method, wherein the high performance computing system and the local network data repository are at least one of controlled, maintained, or managed by a life science service provider.

In one or more aspects, the techniques described herein relate to a method, wherein: the one or more characteristics include one or more genomic mutations present in nucleic acids derived from samples obtained from the subjects; and the nucleic acids correspond to cell-free deoxyribonucleic acid (DNA) extracted from bodily fluid samples obtained from the subjects.

In one or more aspects, the techniques described herein relate to a method, wherein the one or more characteristics include developing resistance to a treatment provided to the subjects in conjunction with a biological condition present in the subjects.

In one or more aspects, the techniques described herein relate to a method, wherein the biological condition corresponds to a form of cancer.

In one or more aspects, the techniques described herein relate to a method, wherein the analysis includes determining a recommendation for a treatment to provide to the subjects to treat a biological condition present in the subjects.

In one or more aspects, the techniques described herein relate to a method, wherein the analysis includes determining a recommendation for media content to be provided to a user of at least one of a media content provider, a communications company, or a content streaming service.

In one or more aspects, the techniques described herein relate to a method, wherein a portion of the system data is transferred to the local network data repository in addition to transferring at least a portion of the metadata to the remote data repository.

In one or more aspects, the techniques described herein relate to a method, including: determining, by the high performance computing system, an amount of memory storage space to store at least a portion of the metadata; and determining, by the high performance computing system, that the amount of memory storage space is at least a threshold amount of memory storage space; wherein the first bandwidth modification request is generated based on the amount of memory storage space being at least the threshold amount of memory storage space.

In one or more aspects, the techniques described herein relate to a method, wherein the second amount of network resources corresponds to a minimum transfer rate of at least a portion of the metadata via the physical communications network to the remote data repository.

In one or more aspects, the techniques described herein relate to a method, wherein the second amount of network resources corresponds to transferring at least a portion of the metadata to the remote data repository in less than a threshold amount of time.

In one or more aspects, the techniques described herein relate to a method, wherein the first bandwidth modification request and the second bandwidth modification request include one or more calls of an application programming interface (API) of a cloud storage service provider.

DETAILED DESCRIPTION

The following description and the drawings sufficiently illustrate specific implementations to enable those skilled in the art to practice them. Other implementations may incorporate structural, logical, electrical, process, and other changes. Portions and features of some implementations may be included in, or substituted for, those of other implementations. Implementations set forth in the claims encompass all available equivalents of those claims.

FIG. 1 illustrates an example architecture 100 to transfer data and metadata between one or more data repositories and computational systems that analyze the data and patient, according to one or more implementations. The architecture 100 can include a life science service provider 102 and can be used to provide high-performance computing services for the life science service provider 102. High performance computing systems can include clusters of processors that can perform calculations in a massively parallel manner. In at least some examples, high performance computing systems can perform calculations and transfer amounts of data that are hundreds of times, thousands of times, up to millions of times greater than typical desktop, laptop, or server systems. High performance computing systems can perform computations using thousand, up to tens of thousands, up to millions of processors and can perform up to quintillions of floating point operations per second.

The life science service provider 102 can include an entity that provides at least one of products or services to individuals. The life science service provider 102 can include at least one of an educational organization, a non-profit organization, a privately owned business, or a publicly owned business. In one or more examples, the life science service provider 102 can include an entity that develops treatments for one or more biological conditions. For example, the life science service provider 102 can include a pharmaceutical company that develops and/or manufactures pharmaceutical substances to treat one or more biological conditions. In addition, the life science service provider 102 can include a diagnostics organization that develops tests to detect the presence of one or more biological conditions in subjects. The life science service provider 102 can also include a medical device entity that develops and/or manufactures medical devices to at least one of treat or detect one or more biological conditions. Further, the life science service provider 102 can include an organization that at least one of develops or manufactures equipment, devices, supplies, or a combination thereof used in at least one of the detection or treatment of one or more biological conditions. In still other examples, the life science service provider 102 can include a medical services provider that provides at least one of testing, medical services, or treatment with regard to one or more biological conditions. In various examples, the life science service provider 102 can include one or more healthcare providers.

As used herein, a healthcare provider may refer to an entity, individual, or group of individuals involved in providing care to individuals in relation to at least one of the treatment or prevention of one or more biological conditions. In addition, as used herein, a biological condition can refer to an abnormality of function and/or structure in an individual to such a degree as to produce or threaten to produce a detectable feature of the abnormality. A biological condition can be characterized by external and/or internal characteristics, signs, and/or symptoms that indicate a deviation from a biological norm in one or more populations. A biological condition can include at least one of one or more diseases, one or more disorders, one or more injuries, one or more syndromes, one or more disabilities, one or more infections, one or more isolated symptoms, or other atypical variations of biological structure and/or function of individuals. Additionally, a treatment, as used herein, can refer to a substance, procedure, routine, device, and/or other intervention that can be administered or performed with the intent of alleviating one or more effects of a biological condition in an individual. In one or more examples, a treatment may include a substance that is metabolized by the individual. The substance may include a composition of matter, such as a pharmaceutical composition. The substance may be delivered to the individual via a number of methods, such as ingestion, injection, absorption, or inhalation. A treatment may also include physical interventions, such as one or more surgeries.

In at least some examples, the life science service provider 102 may at least one of store, access, or analyze data that corresponds to a number of subjects 104. In one or more examples, samples 106 may be extracted from the subjects 104. The samples 106 may be derived from at least one of bodily fluid or tissue obtained from the subjects 104. The samples 106 may be subjected to at least one of one or more diagnostic tests or one or more analytical tests at operation 108. In various examples, the one or more diagnostic tests and/or the one or more analytical tests performed at operation 108 may be performed to detect one or more biological conditions that may be present in the subjects 104. In one or more illustrative examples, the at least one of one or more diagnostic tests or one or more analytical tests performed at operation 108 may include one or more assays that are related to the detection of one or more forms of cancer.

The one or more diagnostic tests and/or one or more analytical tests performed at operation 108 may generate patient data 110. The patient data 110 may include data derived from the one or more diagnostic tests and/or analytical tests performed at operation 108. For example, the patient data 110 may include genomic information, genetic information, metabolomic information, transcriptomic information, fragmentiomic information, immune receptor information, methylation information, epigenomic information, and/or proteomic information, Immunohistochemistry (IHC), and immunofluorescence (IF).

As used herein, "fragmentomic information" may include, among other things, information related to the analysis of the length of DNA or RNA fragments to determine the presence or absence of a tumor and to determine characteristics of the tumors. In at least some examples, the fragmentiomic information can correspond to nucleosomal structure and transcription factor binding sites. In one or more illustrative examples, fragmentiomic information can include fragment endpoint density, plasma DNA sizes, endpoints, nucleosome footprints, the DNA fragments that align with base positions in the genome, the number of DNA fragments that start or end at specific base positions in the genome, fragment starts and length associated with specific conditions, heterogeneous patterns of cfDNA positioning in cancer, nucleosomal occupancy, nucleosome dynamics, chromatin organization, structure, and function, chromatin states, consequence of genomic aberrations, and/or epigenetic changes in DNA associated with health and disease.

Additionally, "genomic information" can correspond to nucleic acid sequences derived from the samples 106. The genomic information may indicate one or more mutations corresponding to genes of the subjects 104. A mutation to a gene of the subjects 104 may correspond to differences between a sequence of nucleic acids of the subjects 104 and one or more reference genomes. The reference genome may include a known reference genome, such as hg19. In various examples, a mutation of a gene of a subject 104 may correspond to a difference in a germline gene of a subject 104 in relation to the reference genome. In one or more additional examples, the reference genome may include a germline genome of a subject 104. In one or more further examples, a mutation to a gene of a subject 104 may include a somatic mutation. Mutations to genes of subjects 104 may be related to insertions, deletions, single nucleotide variants, loss of heterozygosity, duplication, amplification, translocation, fusion genes, or one or more combinations thereof. In at least some examples, the genomic information can correspond to non-coding regions of a genome. The non-coding regions can be related to the regulation of one or more genes. In one or more examples, the analysis of the non-coding regions can detect one or more epigenetic signatures of one or more patients.

In one or more illustrative examples, genomic information included in the patient data 110 may include genomic profiles of tumor cells present within one or more subjects 104. In these situations, the genomic information may be derived from an analysis of genetic material, such as deoxyribonucleic acid (DNA) and/or ribonucleic acid (RNA), found in blood samples of one or more subjects 104 that is present due to the degradation of tumor cells present in the one or more subjects 104. In one or more examples, the genomic information of tumor cells of one or more subjects 104 may correspond to one or more target regions. One or more mutations present with respect to the one or more target regions may indicate the presence of tumor cells in one or more subjects 104.

In one or more illustrative examples, the genetic material analyzed to generate the genomic information may be derived from one or more samples 106, including, but not limited to, a tissue sample or tumor biopsy, circulating tumor cells (CTCs), exosomes or efferosomes, or from circulating nucleic acids. In various examples, the circulating nucleic acids may be referred to herein as "cell-free DNA." "Cell-free DNA," "cfDNA molecules," or simply "cfDNA" include DNA molecules that occur in a subject 104 in extracellular form (e.g., in blood, serum, plasma, or other bodily fluids such as lymph, cerebrospinal fluid, urine, or sputum) and includes DNA not contained within or otherwise bound to a cell at the point of isolation from the subject 104. While the DNA originally existed in a cell or cells of a large complex biological organism (e.g., a mammal) or other cells, such as bacteria, colonizing the organism, the DNA has undergone release from the cell(s) into a fluid found in the organism. cfDNA includes, but is not limited to, cell-free genomic DNA of the subject 104 (e.g., a human subject's genomic DNA) and cell-free DNA of microbes, such as bacteria, inhabiting the subject 104 (whether pathogenic bacteria or bacteria normally found in commonly colonized locations such as the gut or skin of healthy controls), but does not include the cell-free DNA of microbes that have merely contaminated a sample of bodily fluid. Typically, cfDNA may be obtained by obtaining an amount of the fluid without the need to perform an in vitro cell lysis step and also includes removal of cells present in the fluid (e.g., centrifugation of blood to remove cells).

Patient metadata 112 may also be generated based on at least one of the one or more diagnostic tests or one or more analytical tests performed at operation 108. The patient metadata 112 may correspond to the patient data 110 for individual subjects 104. For example, for individual subjects 104, patient metadata 112 may be generated in conjunction with generating the patient data 110 by the one or more diagnostic tests and/or one or more analytical tests at operation 108. The patient metadata 112 may be generated by one or more machines, one or more instruments, one or more medical devices, one or more computing devices, or one or more combinations thereof, in relation to generating the patient data 110 at operation 108. In one or more examples, the patient metadata 112 may indicate information about the one or more machines, one or more instruments, one or more medical devices, one or more computing devices, or one or more combinations thereof, used to generate the patient data 110, such as model numbers, serial numbers, software version numbers, techniques used to generate the patient data 110, settings used to generate the patient data 110, dates and/or times that the patient data 110 was generated, one or more combinations thereof, and the like.

Additionally, the patient metadata 112 may include information about the subjects 104. In one or more illustrative examples, the patient metadata 112 may include identifiers of the subjects 104, physical characteristics of the subjects 104 (e.g., weight, height), age of the subjects 104, personal information of the subjects 104, ethnic background of the subjects 104, one or more combinations thereof, and so forth. Further, the patient metadata 112 may include medical records that correspond to the patient data 110. To illustrate, medical records of the subjects 104 may accompany the patient data 110 and/or be generated in conjunction with the patient data 110. Medical records may include imaging information, laboratory test results, diagnostic test information, clinical observations, dental health information, notes of healthcare practitioners, medical history forms, diagnostic request forms, medical procedure order forms, medical information charts, one or more combinations thereof, and so forth. Medical records may also indicate lifestyle information, such as smoking status, alcohol consumption, sleep habits, one or more combinations thereof, and the like.

The life science service provider 102 may include a bioinformatics system 114 that analyzes at least one of the patient data 110 or the patient metadata 112. The bioinformatics system 114 may implement one or more statistical techniques to analyze at least one of the patient data 110 or the patient metadata 112. In one or more additional examples, the bioinformatics system 114 may implement one or more machine learning techniques to analyze at least one of the patient data 110 or the patient metadata 112. In various examples, the bioinformatics system 114 may analyze at least one of the patient data 110 or the patient metadata 112 to determine characteristics of subjects 104 in which a biological condition is present. For example, the bioinformatics system 114 may analyze at least one of the patient data 110 or the patient metadata 112 to determine one or more genomic features of at least a portion of the subjects 104 in which at least one form of cancer is present. To illustrate, the bioinformatics system 114 may analyze at least one of the patient data 110 or the patient metadata 112 to determine one or more mutations present in samples 106 provided by at least a portion of the subjects 104. In one or more further examples, the bioinformatics system 114 may analyze at least one of the patient data 110 or the patient metadata 112 to identify one or more cohorts that correspond to a number of groups of the subjects 104. In still other examples, the bioinformatics system 114 may analyze at least one of the patient data 110 or the patient metadata 112 to determine an effectiveness of one or more treatments provided to at least a portion of the subjects 104 in relation to one or more biological conditions present in a group of the subjects 104. Additionally, the bioinformatics system 114 may analyze at least one of the patient data 110 or the patient metadata 112 to determine a recommendation for a treatment for at least a portion of the subjects 104 in relation to one or more biological conditions present in a group of the subjects 104. Further, the bioinformatics system 114 may analyze at least one of the patient data 110 or the patient metadata 112 to determine an amount of progression of a biological condition present in at least a portion of the subjects 104. In at least some examples, the bioinformatics system 114 may analyze at least one of the patient data 110 or the patient metadata 112 to determine a biological condition that is present in at least a portion of the subjects 104. In one or more illustrative scenarios, the bioinformatics system 114 may analyze at least one of the patient data 110 or the patient metadata 112 to determine a diagnosis for at least a portion of the subjects 104.

The life science service provider 102 may include one or more computing devices 116 that may access the bioinformatics system 114. The one or more computing devices 116 may include at least one of one or more desktop computing devices, one or more laptop computing devices, one or more tablet computing devices, one or more mobile computing devices, one or more smart phones, one or more wearable computing devices, or one or more combinations thereof. The life science service provider 102 may also include and/or be coupled to a local network data repository 118. In one or more examples, the local network data repository 118 may include one or more data stores that are located on at least one site of the life science service provider 102. In various examples, the local network data repository 118 may be coupled to at least one of the one or more computing devices 116 or the bioinformatics system 114 via one or more physical network connections that are at least one of maintained, controlled, or managed by the life science service provider 102. The local network data repository 118 may store at least one of at least a portion of the patient data 110 or at least a portion of the patient metadata 112.

Additionally, the life science service provider 102 may be in communication with a remote data repository 120. The remote data repository 120 may be located off-site with respect to one or more locations of the life science service provider 102 and be at least one of controlled, maintained, or managed by an entity different from the life science service provider 102. In one or more examples, the remote data repository 120 may be at least one of controlled, maintained, or managed by a third-party cloud computing service provider. In various examples, the remote data repository 120 may store at least one of a portion of the patient data 110 or at least a portion of the patient metadata 112. The life science service provider 102 may be in communication with the remote data repository 120 via a physical communications network 122. The physical communications network 122 may include communications network infrastructure that is at least one of controlled, maintained, or managed by an entity other than the life science service provider 102. For example, the physical communications network 122 may include physical networking equipment that is at least one of controlled, maintained, or managed by a network management system 124 of a network services provider. The network management system 124 may control network resources utilized by a number of different entities that utilize the physical communications network 122 for the transfer and/or access of data. For example, the network management system 124 may allocate bandwidth of the physical communications network 122 for entities that use the physical communications network 122 for at least one of the transfer or access of data, where bandwidth corresponds to an amount of network resources allocated to one or more entities. The network management system 124 may also implement one or more techniques and/or protocols to facilitate the efficient transfer of data between endpoints of the physical communications network 122.

In one or more examples, a virtual communications network 126 may couple the life science service provider 102 with the remote data repository 120. The virtual communications network 126 may correspond to a portion of the physical communications network 122 that is allocated to the life science service provider 102 at a given time. To illustrate, various portions of the network resources of the physical communications network 122 may be allocated to a number of different entities at a given time. In at least some examples, the amount of network resources of the physical communications network 122 that are dedicated to the virtual communications network between the remote data repository 120 and the life science service provider 102 may change over time. In one or more illustrative examples, the bandwidth of the virtual communications network 126 may be modified according to the amounts of data to be transferred between the remote data repository 120 and the life science service provider 102.

The architecture 100 may also include a database management system 128. The database management system 128 may be coupled to the remote data repository 120 and to the local network data repository 118. In one or more examples, the computing device 116 may access data stored by the local network data repository 118 and the remote data repository 120 using the database management system 128. In various examples, the database management system 128 may facilitate the access of at least one of files or objects stored by the local network data repository 118 and the remote data repository 120 in response to requests generated by at least one of the computing device 116 or the bioinformatics system 114.

The life science service provider 102 may utilize memory resources of one or more cloud memory storage providers to store at least one of a portion of the patient data 110 or at least a portion of the patient metadata 112 in the remote data repository 120. In one or more examples, the life science service provider 102 may obtain and/or generate amounts of data that may exceed the capacity of the local network data repository 118. In these scenarios, the excess data may be stored by the remote data repository 120. Additionally, at least one of at least a portion of patient data 110 or at least a portion of the patient metadata 112 may be stored by the remote data repository 120 for other reasons, such as the storage of medical records information to be in compliance with one or more regulatory frameworks. In one or more additional examples, at least one of at least a portion of patient data 110 or at least a portion of the patient metadata 112 may be stored by the remote data repository 120 to minimize cost and/or increase efficiency in regard to the storage and retrieval of information by the life science service provider 102.

In at least some examples, the memory resources to store the patient data 110 may be greater than the memory resources to store the patient metadata 111. In various examples, the memory resources to store the patient data 110 may be two times greater, five times greater, ten times greater, twenty times greater, 50 times greater, up to 100 times greater, up to 1000 times greater, up to 10,000 times greater, up to 100,000 times greater, or more than the memory resources to store the patient metadata 112. In one or more illustrative examples, the patient data 110 may include DNA sequences and expression values for a number of genomic regions with respect to an individual patient, such as tens of genomic regions, hundreds of genomic regions, or thousands of genomic regions, and may consume up to hundreds of gigabytes of memory resources. In one or more additional illustrative examples, the patient metadata 112 for an individual patient may include sample identifiers, batch information, and patient characteristics that can be stored in text files that consume on the order of hundreds of kilobytes of memory resources, although in at least some instances, the amount of memory resources used to store patient metadata 112 for an individual patient can be greater, such as on the order of tens of megabytes to hundreds of megabytes or more.

In one or more examples, the local network data repository 118 may store the patient data 110 and the remote data repository 120 may store the patient metadata 112. In one or more additional examples, the remote data repository 120 may store at least a portion of the patient data 110 and the local network data repository 118 may store at least a portion of the patient metadata 112. In one or more illustrative examples, the local network data repository 118 may include cache memory that stores at least a portion of the patient data 110 and/or a portion of the patient metadata 112 while an analysis of at least one of the patient data 110 or the patient metadata 112 is performed by the bioinformatics system 114.

In various examples, the computing device 116 may be used to generate a request to at least one of transfer or access at least a portion of the patient data 110 and at least a portion of the patient metadata 112. The request to at least one of transfer or access at least a portion of the patient data 110 and at least a portion of the patient metadata 112 may be generated to analyze at least a portion of the patient data 110 and/or at least a portion of the patient metadata 112 using the bioinformatics system 114. In one or more illustrative examples, a request may be generated according to one or more application programming interface (API) calls of the database management system 128 to at least one of transfer or access at least a portion of the patient data 110 and at least a portion of the patient metadata 112. In response to determining that the request is to at least one of transfer or access data that is stored by the local network data repository 118 and by the remote data repository 120 is greater than a threshold amount of memory resources, the life science service provider 102 may send a request to the network management system 124 to temporarily increase the amount of network resources of the physical communications network 122 allocated by the network management system 124 for the life science service provider 102. In these situations, the request sent to the network management system 124 may include one or more API calls of the network management system 124 to increase the virtual communications network 126 in order to increase the rate at which data is transferred to and/or from the remote data repository 120. In one or more examples, the amount of network resources of the physical communications network 122 allocated to the life science service provider 102 by the network management system 124, such as the virtual communications network 126, may be increased in order to transfer and/or access at least one of the patient data 110 or the patient metadata 112 at speeds of at least a threshold rate. The network resources allocated to life science service provider 102 may then be decreased after the requested data has been transferred to and/or from the remote data repository 120 to the life science service provider 102. In this way, the network resources of the network management system 124 are efficiently allocated. That is, because the amount of network resources used to transfer at least a portion of the patient metadata 112 and, in some cases, at least a portion of the patient data 110, between the remote data repository 120 and the life science service provider 102 temporarily increases, the architecture 100 avoids allocating network resources that are not being utilized by the life science service provider 102 and the unused network resources may be allocated to other entities that transfer data using the physical communications network 122 of the network management system 124.

In one or more examples, at least a portion of the patient metadata 112 and, in some cases, at least a portion of the patient data 110 may be transferred to the remote data repository 120 for storage. In one or more additional examples, at least a portion of the patient metadata 112 and, in some cases, at least a portion of the patient data 110 may be transferred to the life science service provider 102 from the remote data repository 120. In these instances, the data transferred from the remote data repository 120 to the life science service provider 102 may be analyzed by the bioinformatics system 114. In one or more further examples, the transfer of at least one of the patient data 110 or the patient metadata 112 from the life science service provider 102 to the remote data repository 120 may take place in relation to the increase of network resources allocated to the virtual communications network 126, while access of one or more portions of at least one of the patient data 110 or the patient metadata 112 stored by the remote data repository 120 to be analyzed by the bioinformatics system 114 may be transferred without the increase of network resources allocated to the virtual communications network 126 in scenarios where the amount of data transferred for storage in the remote data repository 120 is greater than the amount of data being accessed for analysis. That is, the amount of data being accessed for analysis by the bioinformatics system 114 may be a subset of the data transferred to the remote data repository 120 for storage.

Figure 2:
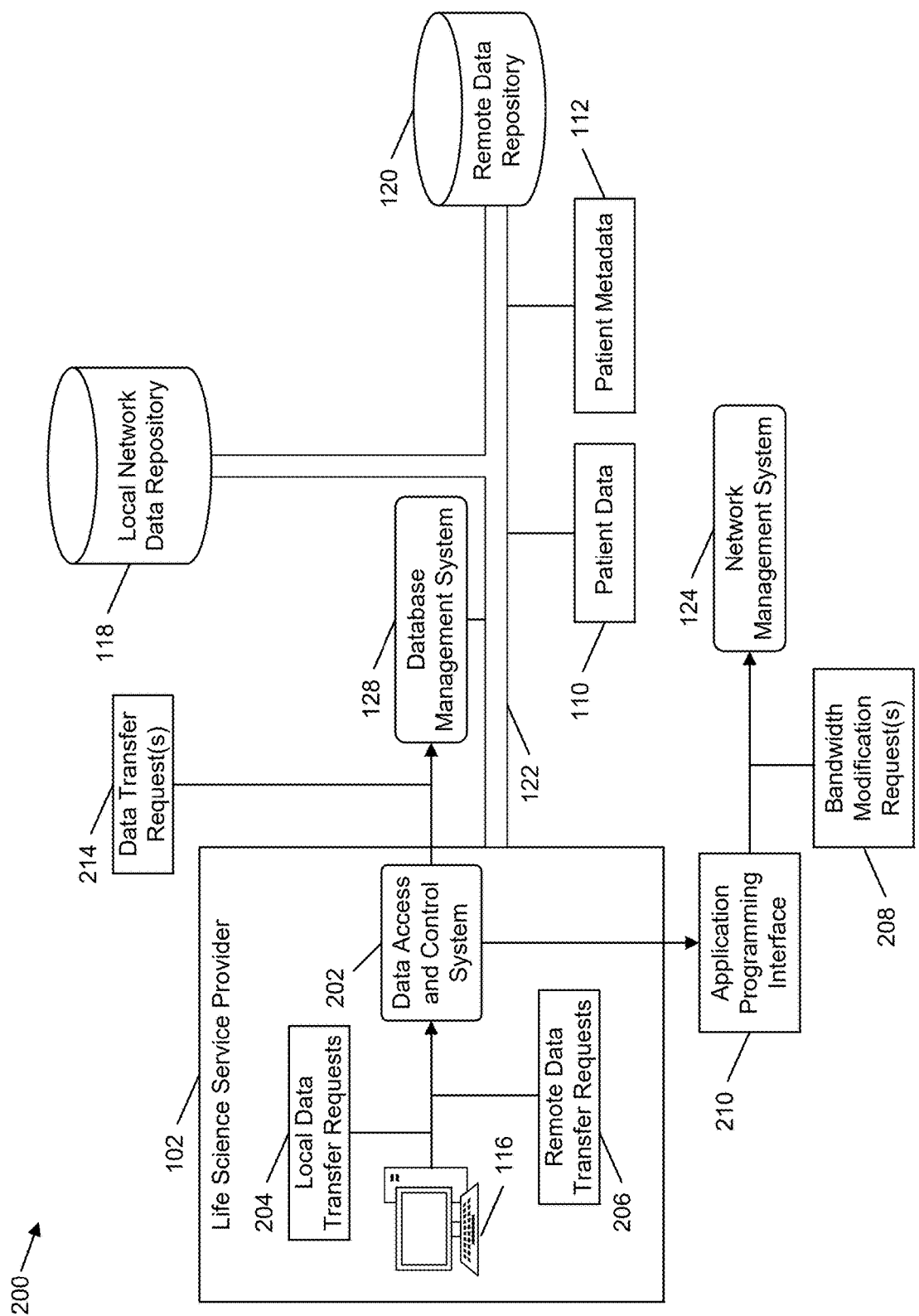
FIG. 2 illustrates an example framework to increase the allocation of network resources during the transfer of patient data and patient metadata from local and remote data repositories, according to one or more implementations.

FIG. 2 illustrates an example framework 200 to increase the allocation of network resources during the transfer of data and metadata from local and remote data repositories, according to one or more implementations. The framework 200 may include the life science service provider 102, the computing device 116, the local network data repository 118, the remote data repository 120, the physical communications network 122, the network management system 124, and the database management system 128 described with respect to FIG. 1. In the illustrative example of FIG. 2, the life science service provider 102 includes a data access and control system 202 that monitors requests to transfer data between the life science service provider 102 and at least one of the local network data repository 118 or the remote data repository 120. In one or more examples, the data access and control system 202 may analyze requests to transfer data between the life science service provider 102 and at least one of the local network data repository 118 or the remote data repository 120 in relation to a threshold amount of data. In at least some examples, the threshold amount of data may correspond to an amount of data that increases the time to transfer the data and/or the rate of transfer of the data to a level that is considered by the life science service provider 102 to be too slow to facilitate efficient computational operations by the life science service provider 102.

In various examples, the computing device 116 may generate local data transfer requests 204 to at least one of access data stored by the local network data repository 118 or transfer data to be stored by the local network data repository 118. The computing device 116 may also generate remote data transfer requests 206 to at least one of access data stored by the remote data repository 120 or transfer data to be stored by the remote data repository 120. In one or more examples, the local data transfer requests 204 and the remote data transfer requests 206 may correspond to at least one of access to or storing of at least one of patient data 110 or patient metadata 112.

The local data transfer requests 204 and the remote data transfer requests 206 may be monitored by the data access and control system 202. The data access and control system 202 may analyze the local data transfer requests 204 and the remote data transfer requests 206 in relation to a threshold amount of data transfer. In situations where the amount of data to be transferred is at least the threshold amount of data, the data access and control system 202 may generate one or more bandwidth modification requests 208. The one or more bandwidth modification requests 208 may indicate a request to indicate an amount of network resources of the physical communications network 122 to allocate to the life science service provider 102. In addition, the one or more bandwidth modification requests 208 may indicate an amount of time for the increased allocation of network resources of the physical communications network 122 by the network management system 124 to the life science service provider 102. In this way, a virtual communications network dedicated to the life science service provider 102 may be increased. In one or more illustrative examples, the one or more bandwidth modification requests 208 may include one or more calls of an application programming interface (API) 210. The API 210 may be provided by the network management system 124 and include at least one of one or more scripts, one or more formats, one or more commands, or one or more combinations thereof, to modify the amount of network resources of the physical communications network 122 to allocate to the life science service provider 102.

In response to the one or more bandwidth modification requests 208, the network management system 124 may increase the amount of network resources of the physical communications network 122 allocated to the virtual communications network dedicated to the life science service provider 102. In this way, the transfer of data related to the local data transfer request 204 and/or the remote data transfer request 206 that triggered the bandwidth modification request 208 can take place at a faster rate and/or in less time than if the bandwidth modification request 208 was not generated by the data access and control system 202.

The data access and control system 202 may send data transfer requests 214 to the database management system 128 in relation to at least one of the local data transfer requests 204 or the remote data transfer requests 206 that triggered the bandwidth modification request 208. The one or more data transfer requests 214 may correspond to an additional API provided by the database management system 128. In one or more examples, the data access and control system 202 may send the data transfer requests 214 to the database management system 128 in response to sending the bandwidth modification request 208 to the network management system 124. In one or more additional examples, the data access and control system 202 may send the data transfer requests 214 to the database management system 128 in response to receiving confirmation from the network management system 124 that the increased allocation of network resources of the physical communications network 122 to the life science service provider 102 has taken place.

In response to the one or more data transfer requests 214, the database management system 128 may cause a transfer of the patient data 110 between at least one of the local network data repository 118 or the remote data repository to the life science service provider 102. Additionally, in response to the one or more data transfer requests 214, the database management system 128 may cause a transfer of the patient metadata 112 between at least one of the local network data repository 118 or the remote data repository 120 and the life science service provider 102. In situations where data is being transferred from the life science service provider 102 and at least one of the local network data repository 118 or the remote data repository 120, the one or more data transfer requests 214 may indicate a storage location for the data. In one or more illustrative examples, the storage location may indicate the local network data repository 118 and/or the remote data repository 120 or one or more specific portions of the local network data repository 118 and/or the remote data repository 120 in which to store the data being transferred. In scenarios where data is being retrieved by the life science service provider 102 from at least one of the local network data repository 118 or the remote data repository 120, the one or more data transfer requests 214 may indicate one or more identifiers of storage locations in the local network data repository 118 and/or the remote data repository 120 for the data being accessed by the life science service provider 102.

In one or more illustrative examples, the life science service provider 102 may obtain an amount of patient data 110 and an amount of patient metadata 112. In various examples, a greater amount of memory resources may be allocated to store the patient data 110 than the patient metadata 112. In one or more additional examples, the patient metadata 112 may be accessed less frequently than the patient data 110 by the life science service provider 102. In one or more examples, at least a portion of the patient data 110 may be stored by the local network data repository 118 and the patient metadata 112 may be stored by the remote data repository 120. In at least some examples, at least a portion of the patient data 110 may be stored by the remote data repository 120.

Continuing with the above example, the computing device 116 may generate a local data transfer request 204 to store at least a portion of the patient data 110 at the local network data repository 118 and a remote data transfer request 206 to store the patient metadata 112 at the remote data repository 120. The data access and control system 202 may analyze the remote data transfer request 206 and determine that the amount of memory resources related to storing at least a portion of the patient data 110 and/or the patient metadata 112 is at least a threshold amount of memory resources. In response, the data access and control system 202 may generate a bandwidth modification request 208 and send the bandwidth modification request to the network management system 124. The bandwidth modification request 208 may indicate an amount of additional network resources of the physical communications network 122 to allocate to the life science service provider 102 and, in at least some instances, an amount of time that the additional network resources are to remain allocated to the life science service provider 102. In one or more examples, the amount of additional resources to be allocated to the life science service provider 102 and the amount of time for the additional resources may be allocated may be provided to the network management system 124 according to one or more calls of the API 210. In various examples, the amount of additional network resources to be allocated to the life science service provider 102 may correspond to a rate of transfer of the patient metadata 112 from the life science service provider 102 to the remote data repository 120 and/or an amount of storage space, such as a number of megabytes, a number of gigabytes of data, or a number of terabytes of data, that correspond to the transfer of the patient metadata 112 from the life science service provider 102 to the remote data repository 120. The data transfer rate may correspond to a number of kilobytes per second, a number of megabits per second, a number of megabytes per second, a number of terabits per second.

In response to the bandwidth modification request 208, the network management system 124 may cause additional network resources of the physical communications network 122 to be allocated to the life science service provider 102. The data access and control system 202 may send a data transfer request 214 to the database management system 128 to cause the transfer of at least a portion of the patient data 110 and/or the patient metadata 112 from the life science service provider 102 for storage by the remote data repository 120 using the portion of the physical communications network 122 dedicated to the life science service provider 102.

In at least some examples, the initial bandwidth modification request 208 may not indicate an amount of time for the additional network resources of the physical communications network to be allocated to the life science service provider 102. In these scenarios, the data access and control system 202 may determine when the transfer of the patient metadata 112 from the life science service provider 102 to the remote data repository 120. In one or more examples, the data access and control system 202 may receive an indication from the database management system 128 that the transfer of the patient metadata 112 is complete. In response to determining that the transfer of the patient metadata 112 to the remote data repository 120 is complete, the data access and control system 202 may generate an additional bandwidth modification request 208. The additional bandwidth modification request 208 may indicate a request to reduce the amount of network resources of the physical communications network 122 allocated to the life science service provider 102. In one or more illustrative examples, the additional bandwidth modification request 208 may indicate a return to the amount of network resources of the physical communications network 122 allocated to the life science service provider 102 before the initial bandwidth modification request 208. In this way, the initial bandwidth modification request 208 may be directed to boosting the network resources of the physical communications network 122 allocated to the life science service provider 102 for the transfer of at least a portion of the patient data 110 and/or the patient metadata 112 to the remote data repository 120 that is terminated by an additional bandwidth modification request 208 sent by the life science service provider 102 to the network management system 124 after the transfer of the patient metadata 112 is complete.

Figure 3:
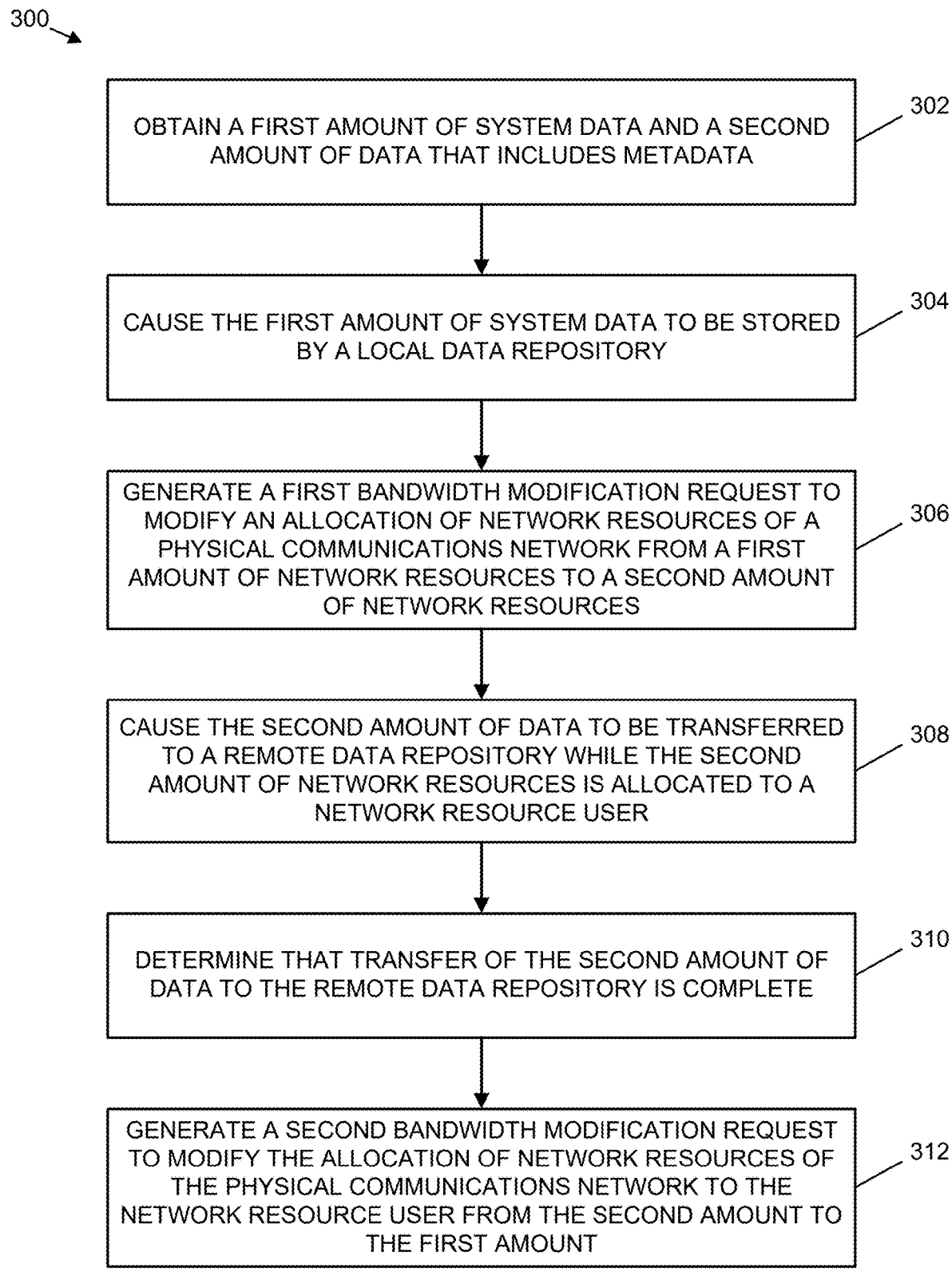
FIG. 3 is a flow diagram of an example process to increase the allocation of network resources during the transfer of system data and metadata from local and remote data repositories, according to one or more implementations.

FIG. 3 is a flow diagram of an example process 300 to increase the allocation of network resources during the transfer of system data and metadata from local and remote data repositories, according to one or more implementations. At operation 302, the process 300 may include obtaining a first amount of system data and a second amount of data that includes metadata. The system data can be generated and/or obtained by an entity that is utilizing the network resources to at least one of transfer information or store information in at least one of local data repositories or remote data repositories. In one or more examples, the entity can include a service provider, an academic institution, a non-profit entity, a research entity, a commercial business, or one or more combinations thereof. In one or more illustrative examples, the system data can be generated by a number of sensors and include meteorological data, molecular data, transportation related data, such as data generated by autonomous vehicle sensors, geological data, and so forth. The system data can also include media content, communications data, financial data, and the like. The metadata can include timing information related to the data, source information related to the data, identification information, prioritization information, destination information, parameters used in generating the data, and so forth.

In one or more additional illustrative examples, the system data and metadata can be related to patients being at least one of tested for or treated for one or more biological conditions. The patient data may include genomic information of a number of subjects. In one or more examples, the genomic information may be derived from one or more samples obtained from the number of subjects. In one or more illustrative examples, the genomic information may be derived from cell-free nucleic acids obtained from one or more bodily fluid samples of the number of subjects. The patient metadata may include information that is related to the patient data, such as information about the subjects from which the patient data is derived, information about apparatuses used to generate at least a portion of the patient data from the samples, information related to the samples, one or more combinations thereof, and the like.

The process 300 may also include, at operation 304, causing the first amount of system data to be stored by a local data repository. The local data repository may be at least one of controlled, maintained, or managed by an entity that is utilizing the network resources to at least one of transfer information or store information in a high performance computing system. In at least some examples, the local data repository may store at least a portion of the system data. In one or more additional examples, the local data repository may store at least a portion of the metadata.

Additionally, at operation 306, the process 300 may include generating a first bandwidth modification request to modify an allocation of network resources of a physical communications network from a first amount of network resources to a second amount of network resources. The second amount of network resources may be greater than the first amount of network resources. In one or more examples, an amount of memory storage space in the remote data repository to be occupied by the portion of the metadata and/or the portion of the system data may be determined and analyzed with respect to a threshold amount of memory storage space. In at least some examples, the first bandwidth modification request may be generated based on the amount of memory storage space to be occupied by at least one of a portion of the system data or a portion of the metadata being at least the threshold amount of memory storage space. In one or more illustrative examples, the first bandwidth modification request and the second bandwidth modification request may include one or more calls of an application programming interface (API) of a cloud storage service provider that at least one of controls, maintains, or manages the remote data repository. In one or more examples, the second amount of network resources may correspond to a minimum transfer rate of the metadata via the physical communications network from the service provider to the remote data repository. In one or more additional examples, the second amount of network resources may correspond to transferring at least one of a portion of the system data or a portion of the metadata from the service provider to the remote data repository in less than a threshold amount of time.

Further, the process 300 may include, at operation 308, causing the second amount of data to be transferred to a remote data repository while the second amount of network resources is allocated to the entity or network resource user. For example, during a time period that the amount of network resources allocated to the life science service provider has been boosted from the first amount of resources to the second amount of network resources, at least one of at least a portion of the system data or a portion of the metadata is transferred from the entity to the remote data repository. In at least some examples, a portion of the system data may be transferred to the remote data repository and a portion of the system data may be transferred to the local data repository.

At 310, the process may include determining that the transfer of the second amount of data to the remote data repository is complete. In one or more illustrative examples, after the second amount of data corresponding to at least one of a portion of the system data or a portion of the metadata has been stored by the remote data repository, a request may be generated to retrieve a specified portion of the system data and a portion of the metadata that corresponds to the specified portion of the system data. In these scenarios, a request may be sent to a database management system to access the portion of the system data stored by the local network data repository and/or the remote data repository and the portion of the metadata stored by the remote data repository. The portion of the system data and the portion of the metadata may then be obtained by the entity. In situations where the entity is a life science service provider and/or a research entity, at least one of the system data or metadata can be subsequently analyzed.

In at least some examples where the system data includes patient data, an analysis may be performed of the portion of the patient data and the portion of the patient metadata. The analysis may determine one or more characteristics of subjects from which the portion of the patient data and the portion of the patient metadata are derived. In one or more examples, the one or more characteristics include one or more genomic mutations present in nucleic acids derived from samples obtained from the subjects. The nucleic acids may correspond to cell-free DNA extracted from bodily fluid samples obtained from the subjects. In one or more additional examples, the one or more characteristics include developing resistance to a treatment provided to the subjects in conjunction with a biological condition present in the subjects. In various examples, the biological condition corresponds to a form of cancer. In one or more further examples, the analysis may include determining a recommendation for a treatment to provide to the subjects to treat a biological condition present in the subjects.

In one or more further examples where the system data includes user data in relation to users of at least one of a media content provider, a communications company, or a content streaming service. In these scenarios, characteristics of the users can be determined by the analysis and the analysis can include determining a recommendation for media content to be provided to the user of at least one of a media content provider, a communications company, or a content streaming service.

In addition, the process 300 may include, at operation 312, generating a second bandwidth modification request to modify the allocation of network resources of the physical communications network to the entity or network resource user from the second amount to the first amount. In this way, the amount of network resources allocated to the entity may return to a previous allocation of network resources before the transfer of the metadata to the remote data repository.

Figure 4:
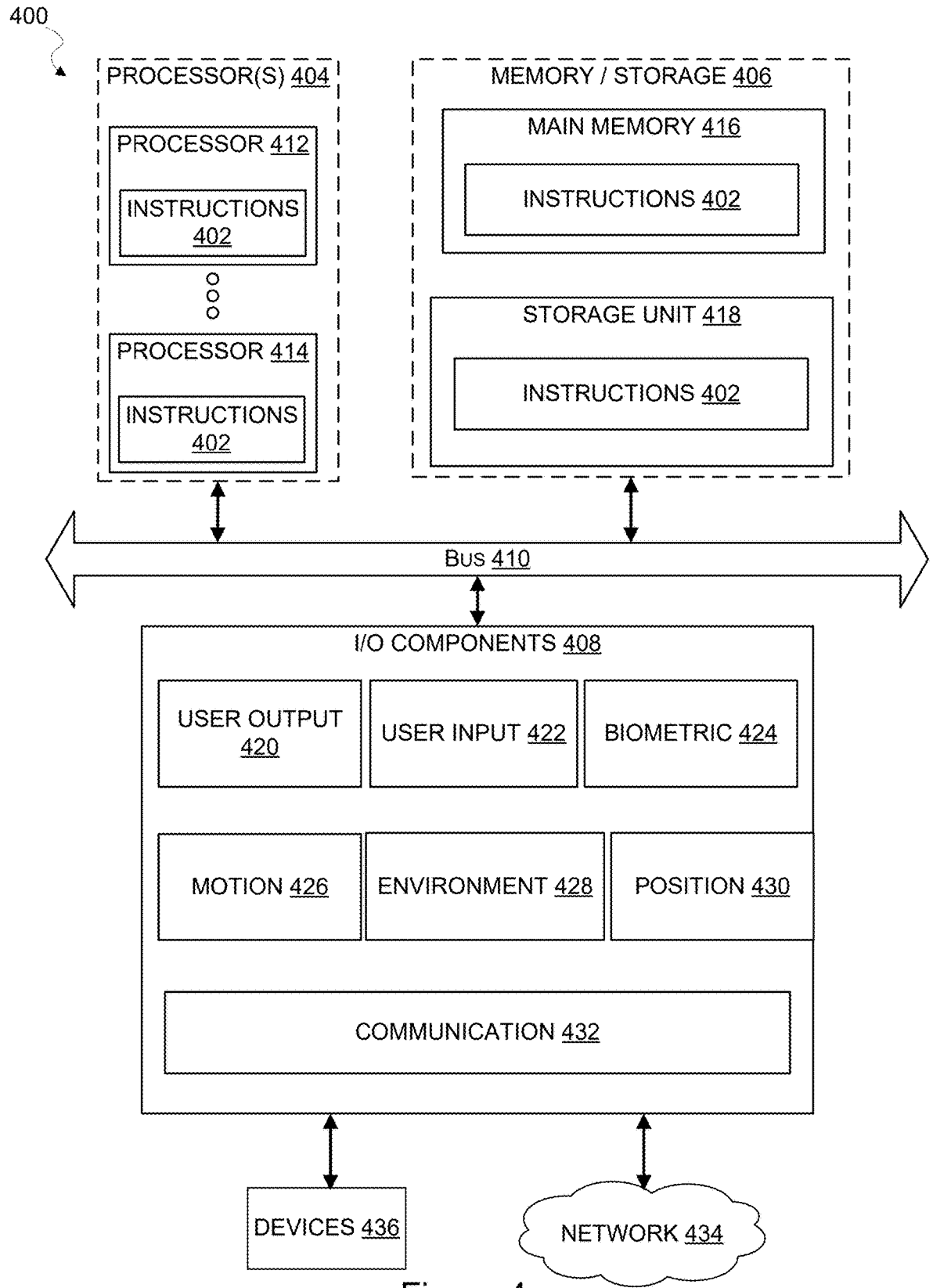
FIG. 4 is a block diagram illustrating components of a machine, in the form of a computer system, that may read and execute instructions from one or more machine-readable media to perform any one or more methodologies described herein, in accordance with one or more example implementations.

FIG. 4 is a block diagram illustrating components of a machine 400, in the form of a computer system, that may read and execute instructions from one or more machine-readable media to perform any one or more methodologies described herein, in accordance with one or more example implementations. Specifically, FIG. 4 shows a diagrammatic representation of the machine 400 in the example form of a computer system, within which instructions 402 (e.g., software, a program, an application, an applet, an app, or other executable code) for causing the machine 400 to perform any one or more of the methodologies discussed herein may be executed. As such, the instructions 402 may be used to implement modules or components described herein. The instructions 402 transform the general, non-programmed machine 400 into a particular machine 400 programmed to carry out the described and illustrated functions in the manner described. In alternative implementations, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 402, sequentially or otherwise, that specify actions to be taken by machine 400. Further, while only a single machine 400 is illustrated, the term "machine" shall also be taken to include a collection of machines that individually or jointly execute the instructions 402 to perform any one or more of the methodologies discussed herein.

The machine 400 may include processors 404, memory/storage 406, and I/O components 408, which may be configured to communicate with each other such as via a bus 410. In an example implementation, the processors 404 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 402. The term "processor" is intended to include multi-core processors 404 that may comprise two or more independent processors (sometimes referred to as "cores") that may execute instructions 402 contemporaneously. Although FIG.

4 shows multiple processors 404, the machine 400 may include a single processor 412 with a single core, a single processor 412 with multiple cores (e.g., a multi-core processor), multiple processors 412, 414 with a single core, multiple processors 412, 414 with multiple cores, or any combination thereof.

The memory/storage 406 may include memory, such as a main memory 416, or other memory storage, and a storage unit 418, both accessible to the processors 404 such as via the bus 410. The storage unit 418 and main memory 416 store the instructions 402 embodying any one or more of the methodologies or functions described herein. The instructions 402 may also reside, completely or partially, within the main memory 416, within the storage unit 418, within at least one of the processors 404 (e.g., within the processor's cache memory), or any suitable combination thereof, during execution thereof by the machine 400. Accordingly, the main memory 416, the storage unit 418, and the memory of processors 404 are examples of machine-readable media.

The I/O components 408 may include a wide variety of components to receive input, provide output, produce output, transmit information, exchange information, capture measurements, and so on. The specific I/O components 408 that are included in a particular machine 400 will depend on the type of machine. For example, portable machines such as mobile phones will likely include a touch input device or other such input mechanisms, while a headless server machine will likely not include such a touch input device. It will be appreciated that the components 408 may include many other components that are not shown in FIG. 5. The I/O components 408 are grouped according to functionality merely for simplifying the following discussion and the grouping is in no way limiting. In various example implementations, the I/O components 408 may include user output components 420 and user input components 422. The user output components 420 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 422 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 408 may include biometric components 424, motion components 426, environmental components 428, or position components 430 among a wide array of other components. For example, the biometric components 424 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 426 may include acceleration sensor components (e.g., accelerometer), gravitation sensor components, rotation sensor components (e.g., gyroscope), and so forth.

The environmental components 428 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 430 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 408 may include communication components 432 operable to couple the machine 400 to a network 434 or devices 436. For example, the communication components 432 may include a network interface component or other suitable device to interface with the network 434. In further examples, communication components 432 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 436 may be another machine 400 or any of a wide variety of peripheral devices (e.g., a peripheral device coupled via a USB).

Moreover, the communication components 432 may detect identifiers or include components operable to detect identifiers. For example, the communication components 432 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 432, such as location via Internet Protocol (IP) geo-location, location via Wi-Fi® signal triangulation, location via detecting an NFC beacon signal that may indicate a particular location, and so forth.

As used herein, "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 404 or other programmable processor. Once configured by such software, hardware components become specific machines (or specific components of a machine 400) uniquely tailored to perform the configured functions and are no longer general-purpose processors 404. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 404 configured by software to become a special-purpose processor, the general-purpose processor 404 may be configured as respectively different special-purpose processors (e.g., comprising different hardware components) at different times. Software accordingly configures a particular processor 412, 414 or processors 404, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 404 that are temporarily configured (e.g., by software) or permanently configured to perform the relevant operations. Whether temporarily or permanently configured, such processors 404 may constitute processor-implemented components that operate to perform one or more operations or functions described herein. As used herein, "processor-implemented component" refers to a hardware component implemented using one or more processors 404. Similarly, the methods described herein may be at least partially processor-implemented, with a particular processor 412, 414 or processors 404 being an example of hardware. For example, at least some of the operations of a method may be performed by one or more processors 404 or processor-implemented components. Moreover, the one or more processors 404 may also operate to support performance of the relevant operations in a "cloud computing" environment or as a "software as a service" (SaaS). For example, at least some of the operations may be performed by a group of computers (as examples of machines 400 including processors 404), with these operations being accessible via a network 434 (e.g., the Internet) and via one or more appropriate interfaces (e.g., an API). The performance of certain of the operations may be distributed among the processors, not only residing within a single machine 400, but deployed across a number of machines. In some example implementations, the processors 404 or processor-implemented components may be located in a single geographic location (e.g., within a home environment, an office environment, or a server farm). In other example implementations, the processors 404 or processor-implemented components may be distributed across a number of geographic locations.

Figure 5:
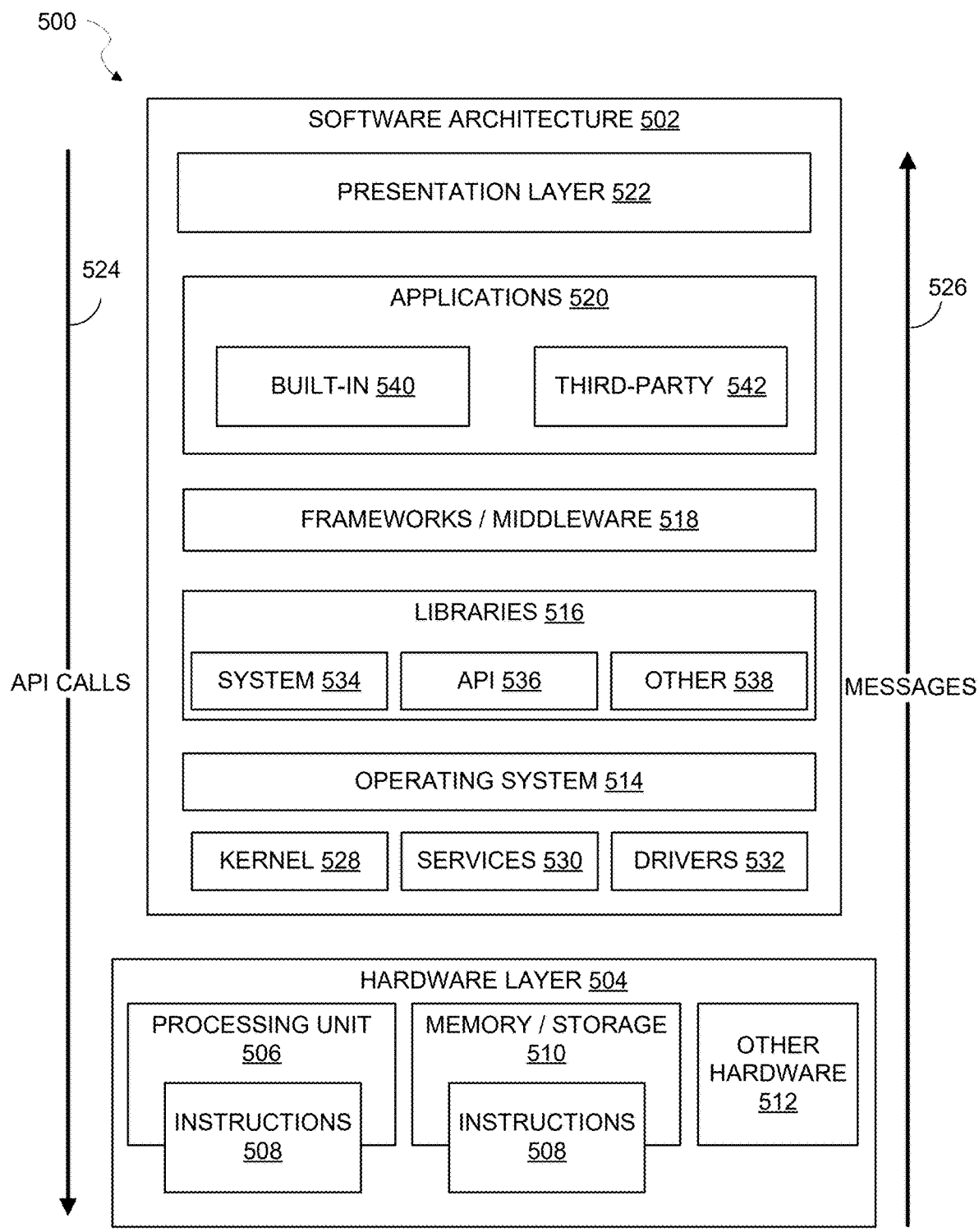
FIG. 5 is a block diagram illustrating a representative software architecture that may be used in conjunction with one or more hardware architectures described herein, in accordance with one or more example implementations.

FIG. 5 is a block diagram illustrating system 500 that includes an example software architecture 502, which may be used in conjunction with various hardware architectures herein described. FIG. 5 is a non-limiting example of a software architecture, and it will be appreciated that many other architectures may be implemented to facilitate the functionality described herein. The software architecture 502 may execute on hardware such as machine 400 of FIG. 4 that includes, among other things, processors 404, memory/storage 406, and input/output (I/O) components 408. A representative hardware layer 504 is illustrated and can represent, for example, the machine 400 of FIG. 4. The representative hardware layer 504 includes a processing unit 506 having associated executable instructions 508. Executable instructions 508 represent the executable instructions of the software architecture 502, including implementation of the methods, components, and so forth described herein. The hardware layer 504 also includes at least one of memory or storage modules memory/storage 510, which also have executable instructions 508. The hardware layer 504 may also comprise other hardware 512.

In the example architecture of FIG. 5, the software architecture 502 may be conceptualized as a stack of layers where each layer provides particular functionality. For example, the software architecture 502 may include layers such as an operating system 514, libraries 516, frameworks/middleware 518, applications 520, and a presentation layer 522. Operationally, the applications 520 or other components within the layers may invoke API calls 524 through the software stack and receive messages 526 in response to the API calls 524. The layers illustrated are representative in nature and not all software architectures have all layers. For example, some mobile or special purpose operating systems may not provide a frameworks/middleware 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 are responsible for controlling or interfacing with the underlying hardware. For instance, the drivers 532 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 provide a common infrastructure that is used by at least one of the applications 520, other components, or layers. The libraries 516 provide functionality that allows other software components to perform tasks in an easier fashion than to interface directly with the underlying operating system 514 functionality (e.g., kernel 528, services 530, drivers 532). The libraries 516 may include system libraries 534 (e.g., C standard library) that may provide functions such as memory allocation functions, string manipulation functions, mathematical functions, and the like. In addition, the libraries 516 may include API libraries 536 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks/middleware 518 (also sometimes referred to as middleware) provide a higher-level common infrastructure that may be used by the applications 520 or other software components/modules. For example, the frameworks/middleware 518 may provide various graphical user interface functions, high-level resource management, high-level location services, and so forth. The frameworks/middleware 518 may provide a broad spectrum of other APIs that may be utilized by the applications 520 or other software components/modules, some of which may be specific to a particular operating system 514 or platform.

The applications 520 include built-in applications 540 and third-party applications 542. Examples of representative built-in applications 540 may include, but are not limited to, a contacts application, a browser application, a book reader application, a location application, a media application, a messaging application, or a game application. Third-party applications 542 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 542 may invoke the API calls 524 provided by the mobile operating system (such as operating system 514) to facilitate functionality described herein.

The applications 520 may use built-in operating system functions (e.g., kernel 528, services 530, drivers 532), libraries 516, and frameworks/middleware 518 to create UIs to interact with users of the system. Alternatively, or additionally, in some systems, interactions with a user may occur through a presentation layer, such as presentation layer 522. In these systems, the application/component "logic" can be separated from the aspects of the application/component that interact with a user.

At least some of the processes described herein can be embodied in computer-readable instructions for execution by one or more processors such that the operations of the processes may be performed in part or in whole by the functional components of one or more computer systems. Accordingly, computer-implemented processes described herein are by way of example with reference thereto, in some situations. However, in other implementations, at least some of the operations of the computer-implemented processes described herein can be deployed on various other hardware configurations. The computer-implemented processes described herein are therefore not intended to be limited to the systems and configurations described with respect to FIGS. 4 and 5 and can be implemented in whole, or in part, by one or more additional system and/or components.

Although the flowcharts described herein can show operations as a sequential process, many of the operations can be performed in parallel or concurrently. In addition, the order of the operations can be re-arranged. A process is terminated when its operations are completed. A process can correspond to a method, a procedure, an algorithm, etc. The operations of methods may be performed in whole or in part, can be performed in conjunction with some or all of the operations in other methods, and can be performed by any number of different systems, such as the systems described herein, or any portion thereof, such as a processor included in any of the systems.

As used herein, a component, can refer to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

It should be understood that the individual steps used in the methods of the present teachings may be performed in any order and/or simultaneously, as long as the teaching remains operable. Furthermore, it should be understood that the apparatus and methods of the present teachings can include any number, or all, of the described implementations, as long as the teaching remains operable.

The various steps of the methods disclosed herein, or the steps carried out by the systems disclosed herein, may be carried out at the same time or different times, and/or in the same geographical location or different geographical locations, e.g., countries. The various steps of the methods disclosed herein can be performed by the same person or different people.

Various implementations of systems, devices, and methods have been described herein. These implementations are given only by way of example and are not intended to limit the scope of the claimed inventions. It should be appreciated, moreover, that the various features of the implementations that have been described may be combined in various ways to produce numerous additional implementations. Moreover, while various materials, dimensions, shapes, configurations and locations, etc. have been described for use with disclosed implementations, others besides those disclosed may be utilized without exceeding the scope of the claimed inventions.

Persons of ordinary skill in the relevant arts will recognize that implementations may comprise fewer features than illustrated in any individual implementation described above. The implementations described herein are not meant to be an exhaustive presentation of the ways in which the various features may be combined. Accordingly, the implementations are not mutually exclusive combinations of features; rather, implementations can comprise a combination of different individual features selected from different individual implementations, as understood by persons of ordinary skill in the art. Moreover, elements described with respect to one implementation can be implemented in other implementations even when not described in such implementations unless otherwise noted. Although a dependent claim may refer in the claims to a specific combination with one or more other claims, other implementations can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one implementation," "an implementation," or "some implementations" means that a particular feature, structure, or characteristic, described in connection with the implementation, is included in at least one implementation of the teaching. The appearances of the phrase "in one implementation" in various places in the specification are not necessarily all referring to the same implementation.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Although an implementation has been described with reference to specific example implementations, it will be evident that various modifications and changes may be made to these implementations without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific implementations in which the subject matter may be practiced. The implementations illustrated are described in sufficient detail to enable those skilled in the art to practice the teachings disclosed herein. Other implementations may be utilized and derived therefrom, such that structural and logical substitutions and changes may be made without departing from the scope of this disclosure. This Detailed Description, therefore, is not to be taken in a limiting sense, and the scope of various implementations is defined only by the appended claims, along with the full range of equivalents to which such claims are entitled.

Although specific implementations have been illustrated and described herein, it should be appreciated that any arrangement calculated to achieve the same purpose may be substituted for the specific implementations shown. This disclosure is intended to cover any and all adaptations or variations of various implementations. Combinations of the above implementations, and other implementations not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A method comprising:
   obtaining, by a computing system of a life science service provider that includes processing circuitry and memory, a first amount of data that includes patient data and a second amount of data that includes patient metadata, the patient data including genomic information of a number of subjects;
   causing, by the computing system, the first amount of data to be stored by a local network data repository that is at least one of controlled, maintained, or managed by the life science service provider;
   generating, by the computing system, a first bandwidth modification request to modify an allocation of network resources of a physical communications network to the life science service provider from a first amount of network resources to a second amount of network resources for a time period of less than a threshold amount of time,
   based on an amount of memory storage space to store at least a portion of the patient data, at least a portion of the patient metadata, or a combination thereof being at least a threshold amount of memory storage space,
   the second amount of network resources being greater than the first amount of network resources, and allocated to support a minimum transfer rate of at least a portion of the patient data and/or at least a portion of the patient metadata via the physical communications network from the life science services provider to the remote data repository;

causing, by the computing system, at least a portion of the second amount of data to be transferred to a remote data repository while the second amount of network resources is allocated to the life science service provider during the time period, wherein the portion of the second amount of data is less than an available amount of memory storage space;

determining, by the computing system, that transfer of the at least a portion of the second amount of data to the remote data repository is complete; and generating, by the computing system, a second bandwidth modification request to modify the allocation of network resources of the physical communications network to the life science service provider from the second amount to the first amount.

2. The method of claim 1, comprising:
receiving, by the computing system, a request to retrieve a portion of the patient data;
determining, by the computing system, one or more portions of the patient metadata that corresponds to the portion of the patient data;
sending, by the computing system, a request to a database management system to access the portion of the patient data stored by the local network data repository and the one or more portions of the patient metadata stored by the remote data repository; and
obtaining, by the computing system, the portion of the patient data and the one or more portions of the patient metadata.

3. The method of claim 2, comprising:
performing, by a bioinformatics system implemented by the computing system, an analysis of the portion of the patient data and the one or more portions of the patient metadata; and
determining, by the computing system and based on the analysis, one or more characteristics of subjects that correspond to the portion of the patient data and the one or more portions of the patient metadata.

4. The method of claim 3, wherein the one or more characteristics include developing resistance to a treatment provided to the subjects in conjunction with a biological condition present in the subjects.

5. The method of claim 4, wherein the biological condition corresponds to a form of cancer.

6. The method of claim 3, wherein:
the one or more characteristics include one or more genomic mutations present in nucleic acids derived from samples obtained from the subjects; and
the nucleic acids correspond to cell-free deoxyribonucleic acid (DNA) extracted from bodily fluid samples obtained from the subjects.

7. The method of claim 3, wherein the analysis includes determining a recommendation for a treatment to provide to the subjects to treat a biological condition present in the subjects.

8. The method of claim 1, wherein a portion of the patient data is transferred to the local network data repository in addition to transferring at least a portion of the patient metadata to the remote data repository.

9. The method of claim 1, wherein the first bandwidth modification request and the second bandwidth modification request include one or more calls of an application programming interface (API) of a cloud storage service provider.

10. A system comprising:
one or more hardware processing units; and
one or more computer-readable storage media storing computer-executable instructions that, when executed by the one or more hardware processing units, cause the system to perform operations comprising:
obtaining, by a life science service provider, a first amount of data that includes patient data and a second amount of data that includes patient metadata, the patient data including genomic information of a number of subjects;
causing the first amount of data to be stored by a local network data repository that is at least one of controlled, maintained, or managed by the life science service provider;
generating a first bandwidth modification request to modify an allocation of network resources of a physical communications network to the life science service provider from a first amount of network resources to a second amount of network resources for a time period of less than a threshold amount of time,
based on an amount of memory storage space to store at least a portion of the patient data, at least a portion of the patient metadata, or a combination thereof being at least a threshold amount of memory storage space,
the second amount of network resources being greater than the first amount of network resources, and allocated to support a minimum transfer rate of at least a portion of the patient data and/or at least a portion of the patient metadata via the physical communications network from the life science services provider to the remote data repository;
causing at least a portion of the second amount of data to be transferred to a remote data repository while the second amount of network resources is allocated to the life science service provider during the time period, wherein the portion of the second amount of data is less than an available amount of memory storage space;
determining that transfer of the at least a portion of the second amount of data to the remote data repository is complete; and
generating a second bandwidth modification request to modify the allocation of network resources of the physical communications network to the life science service provider from the second amount to the first amount.

11. The system of claim 10, wherein the one or more computer-readable storage media store additional computer-executable instructions that, when executed by the one or more hardware processing units, cause the system to perform additional operations comprising:
receiving a request to retrieve a portion of the patient data;
determining one or more portions of the patient metadata that corresponds to the portion of the patient data;
sending a request to a database management system to access the portion of the patient data stored by the local network data repository and the one or more portions of the patient metadata stored by the remote data repository; and
obtaining the portion of the patient data and the one or more portions of the patient metadata.

12. The system of claim 11, wherein the one or more computer-readable storage media store additional computer-executable instructions that, when executed by the one or more hardware processing units, cause the system to perform additional operations comprising:

performing, by a bioinformatics system of the life science service provider, an analysis of the portion of the patient data and the one or more portions of the patient metadata; and determining, based on the analysis, one or more characteristics of subjects that correspond to the portion of the patient data and the one or more portions of the patient metadata.

13. The system of claim 12, wherein the one or more characteristics include developing resistance to a treatment provided to the subjects in conjunction with a biological condition present in the subjects.

14. The system of claim 13, wherein the biological condition corresponds to a form of cancer.

15. The system of claim 12, wherein:
the one or more characteristics include one or more genomic mutations present in nucleic acids derived from samples obtained from the subjects; and
the nucleic acids correspond to cell-free deoxyribonucleic acid (DNA) extracted from bodily fluid samples obtained from the subjects.

16. The system of claim 12, wherein the one or more computer-readable storage media store additional computer-executable instructions that, when executed by the one or more hardware processing units, cause the system to perform additional operations comprising:
determining, as part of the analysis, a recommendation for a treatment to provide to the subjects to treat a biological condition present in the subjects.

17. The system of claim 10, wherein the one or more computer-readable storage media store additional computer-executable instructions that, when executed by the one or more hardware processing units, cause the system to perform additional operations comprising:
transferring a portion of the patient data to the local network data repository in conjunction with the transfer of at least a portion of the patient metadata to the remote data repository.

18. The system of claim 10, wherein the first bandwidth modification request and the second bandwidth modification request include one or more calls of an application programming interface (API) of a cloud storage service provider.

19. A non-transitory computer-readable apparatus comprising a storage medium, the storage medium comprising a plurality of instructions configured to, when executed by one or more processor apparatus, cause performance of operations comprising:
obtaining, by a computing system of a life science service provider that includes processing circuitry and memory, a first amount of data that includes patient data and a second amount of data that includes patient metadata, the patient data including genomic information of a number of subjects;

causing, by the computing system, the first amount of data to be stored by a local network data repository that is at least one of controlled, maintained, or managed by the life science service provider;

generating, by the computing system, a first bandwidth modification request to modify an allocation of network resources of a physical communications network to the life science service provider from a first amount of network resources to a second amount of network resources for a time period of less than a threshold amount of time, based on an amount of memory storage space to store at least a portion of the patient data, at least a portion of the patient metadata, or a combination thereof being at least a threshold amount of memory storage space, the second amount of network resources being greater than the first amount of network resources, and allocated to support a minimum transfer rate of at least a portion of the patient data and/or at least a portion of the patient metadata via the physical communications network from the life science services provider to the remote data repository;

causing, by the computing system, at least a portion of the second amount of data to be transferred to a remote data repository while the second amount of network resources is allocated to the life science service provider during the time period, wherein the portion of the second amount of data is less than an available amount of memory storage space;

determining, by the computing system, that transfer of the at least a portion of the second amount of data to the remote data repository is complete; and generating, by the computing system, a second bandwidth modification request to modify the allocation of network resources of the physical communications network to the life science service provider from the second amount to the first amount.

20. The non-transitory computer-readable apparatus of claim 19, wherein:
the patient data further comprises genetic information, metabolomic information, transcriptomic information, fragmentomics information, immune receptor information, methylation information, epigenomic information, proteomic information, immunohistochemistry (IHC) information, immunofluorescence (IF) information, or a combination thereof, of the number of subjects; and
the patient metadata comprises identifiers of the number of subjects, characteristics of the number of subjects, medical information of the number of subjects, information about a device used to generate the patient data, or a combination thereof.

* * * * *